(12) United States Patent
Martin et al.

(10) Patent No.: US 9,807,567 B1
(45) Date of Patent: Oct. 31, 2017

(54) TECHNIQUES FOR HEURISTICALLY DETERMINING COORDINATES IN A WIRELESS NETWORK

(71) Applicant: WIGWAG, Inc., Austin, TX (US)

(72) Inventors: Jonathan L. Martin, Austin, TX (US); Yash Goyal, Austin, TX (US)

(73) Assignee: WIGWAG, INC., Austin, TX (US)

( * ) Notice: Subject to any disclaimer, the term of this patent is extended or adjusted under 35 U.S.C. 154(b) by 0 days.

(21) Appl. No.: 15/174,982

(22) Filed: Jun. 6, 2016

(51) Int. Cl.
*H04M 3/42* (2006.01)
*H04W 4/04* (2009.01)
*H04B 17/318* (2015.01)
*H04W 4/02* (2009.01)
*H04L 12/933* (2013.01)

(52) U.S. Cl.
CPC ............ *H04W 4/04* (2013.01); *H04B 17/318* (2015.01); *H04L 49/1584* (2013.01); *H04W 4/028* (2013.01)

(58) Field of Classification Search
None
See application file for complete search history.

(56) References Cited

U.S. PATENT DOCUMENTS

2016/0285717 A1* 9/2016 Kim .................... H04L 43/0823
2016/0358459 A1* 12/2016 Singhar ................. G08C 17/02

\* cited by examiner

*Primary Examiner* — Idowu O Osifade
(74) *Attorney, Agent, or Firm* — AdamantineIP

(57) ABSTRACT

A technique for a network entity to locate a first device and a second device within a communication network is described. The technique receives measurement data from the first device and the second device, appends the received measurements data to a database that includes prior measurement data, and determines coordinate values for each of the first device and the second device based on the measurement data and at least a portion of the prior measurement data. The technique may further determine a location distribution for one of the first device and the second device with respect to the network entity and determine a statistical coordinate value for the first device and the second device. The location distribution may be adjusted based on whether the device is mobile or stationary.

54 Claims, 6 Drawing Sheets

TECHNIQUES FOR HEURISTICALLY DETERMINING COORDINATES IN A WIRELESS NETWORK

BACKGROUND

Field

The present disclosure generally relates to network communication, and more specifically to location detection of network devices in an indoor environment.

Background

Positioning techniques such as multilateration, triangulation, and trilateration rely on precise measurement of independent distances or angles in order to accurately determine positioning. For example, a global positioning systems (GPS) receiver uses multilateration to provide precise positioning anywhere on or near the Earth's surface where there is an unobstructed line-of-sight to four GPS satellites. In particular, GPS is designed so that each satellite shares a common clock and the design relies on precise positioning of each satellite being known with a very high degree of accuracy. The design implements a simplex communication in that each satellite does not receive a signal from a GPS receiver and instead assumes that each GPS receiver does not share a common clock with the satellites. Under this assumption, a GPS receiver acquires signals between at least four independent satellites to unambiguously distinguish a position instead of three independent satellites. In particular, the GPS receiver calculates a first difference in distance between a pair of satellite stations and calculates a second difference in distance between a different pair of two satellite stations based on broadcasts sent from the each satellite at known times.

Because GPS relies on line-of-sight signals from at least four satellites to determine positioning, a GPS receiver may not work when some of the satellite signals are obstructed. For example, a GPS receiver may not work indoor environments (e.g., inside buildings) since obstructions may attenuate satellite signals beyond the four satellites coverage. In addition, the multiple reflections at surfaces cause multipath propagation serving for uncontrollable errors.

For indoor environments, relative signal strength indicators (RSSI) or received channel power indicator (RCPI) from stations may be used to assist in location determination. In particular, a network system may use triangulation or trilateration based on RSSI or RCPI measurements that are piggy-backed on known locations (e.g., anchor locations) from GPS measurements to provide relative locations within an indoor environment. The drawback of this technique is that RSSI and RCPI measurements are susceptible to obstructions and reflections that result in inaccurate measurements. The inability to reduce RSSI measurement error has hindered the determination of accurate location of indoor environment. As such, indoor environment location determination techniques would benefit from techniques to provide accurate coordinates from RSSI measurements despite the measurement error.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented below.

In some aspects, a method of a network entity locating one or more devices within a communication network, comprising: receiving measurement data from one or more devices, wherein the one or more devices comprises a first device and a second device; appending a database with the measurement data, wherein the database comprises the measurement data and prior measurement data detected by the first device and the second device; and determining coordinate values for each of the first device and the second device based on the measurement data and at least a portion of the prior measurement data.

In some aspects, a computer-readable storage medium comprising one or more programs for execution by one or more processors of a network entity, the one or more programs including instructions which, when executed by the one or more processors, cause the electronic device to: receive measurement data from one or more devices, wherein the one or more devices comprises a first device and a second device; append a database with the measurement data, wherein the database comprises the measurement data and prior measurement data detected by the first device and the second device; and determine coordinate values for each of the first device and the second device based on the measurement data and at least a portion of the prior measurement data.

In some aspects, a network entity configured to locate one or more network devices, comprising: one or more processors; memory; and one or more programs stored in memory, the one or more programs including instructions for: receiving measurement data from one or more devices, wherein the one or more devices comprises a first device and a second device; appending a database with the measurement data, wherein the database comprises the measurement data and prior measurement data detected by the first device and the second device; and determining coordinate values for each of the first device and the second device based on the measurement data and at least a portion of the prior measurement data.

DESCRIPTION OF THE FIGURES

For a better understanding of the various described aspects, reference should be made to the description below, in conjunction with the following figures in which like reference numerals refer to corresponding parts throughout the figures.

DETAILED DESCRIPTION

Figure 1:
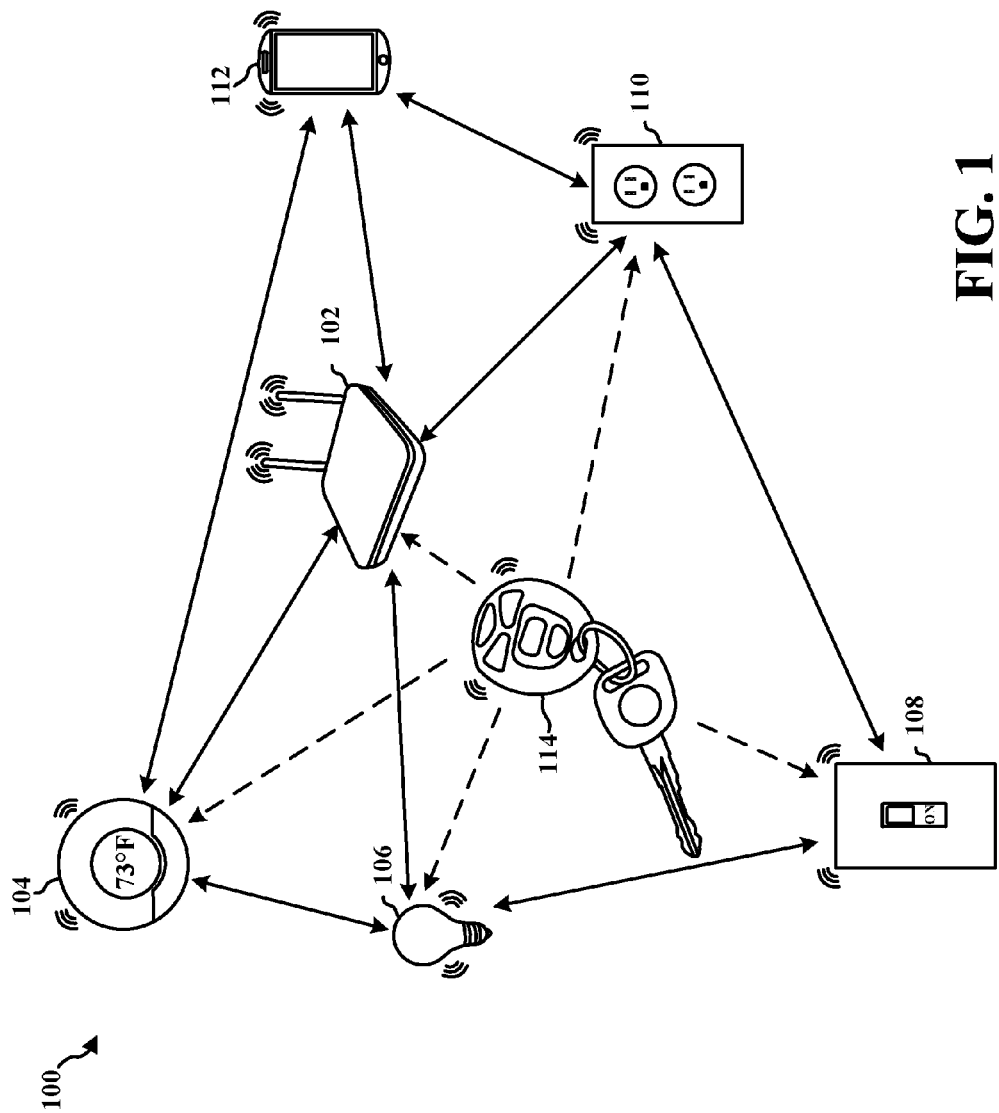
FIG. 1 is a diagram illustrating an example of an indoor communication network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of network systems will now be presented with reference to various apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

The present disclosure provides a wireless network localization technique to more accurately determine coordinates of one or more devices within a communication network. In one aspect of the technique, an access point determines whether a device is stationary or has moved. In the event that the device has moved the access point 102 triggers the moved device to transmit a range detection signal. In some instances, the moved device may be configured to periodically transmit range detection signal until it is determined that the moved device has stopped moving. The range detection signal may be a radio signal (e.g., RSSI or RCPI), an acoustic signal (e.g., infrasonic, sonic, ultrasonic), or a combination of a radio signal and an acoustic signal. An indicator may be placed on the latest data to indicate that the device is in transit, which corresponds to a low confidence value being assigned.

Once the network entity determines that the device is no longer in transit (e.g., the coordinate does not deviate above a threshold) the access point may begin to gather measurement data to determine a location distribution. In addition, the network entity may assign progressively higher confidence levels to the expected coordinate location (e.g., the statistically most likely coordinate). In particular, this technique appends the latest measurement data to prior measurement data in a database. This approach further aggregates the data from one or more proximate devices within the communication network 100 to determine a location distribution. In particular, the coordinate locations of one or more devices from a network entity may differ from the perspective of other device (e.g., obstruction may not be in the path of a neighboring device). As such, the coordinate locations from the perspective of one device may differ from the coordinate locations from the perspective of another device. By gathering measurement data from latest measurement and prior measurements to determine an expected coordinate location (e.g., the statistically most likely coordinate) for each device, the technique may significantly improve the accuracy of device coordinate locations.

FIG. 1 is a diagram illustrating an example of an indoor communication network. The communication network 100 includes a network entity that is wirelessly connected directly or indirectly to one or more devices (e.g., thermostat 104, light fixture 106, light fixture 108, power outlet 110, mobile device 112, and key fob 114). In some aspects, the one or more devices, the first device, and the second device is each an Internet-of-Things device (IoT). In some aspects, the network entity is one of a server, a relay, or a router.

As depicted in FIG. 1, the communication network 100 is configured according to a mesh network so that each device may communicate with neighboring device within range to propagate messages with measurement data along a path by relaying the messages from device to device until the message reaches its destination. For example, access point 102 may directly communication with thermostat 104, light fixture 106, power outlet 110, mobile device 112, and key fob 114 but cannot directly communicate with switch 108 as switch 108 is out of range of access point 102. In this instance, light switch 108 may transmit a message with measurement data to either light fixture 106 or power outlet 110, which may subsequently be relayed to access point 102.

In some aspects, the communication network 100 is a mesh network. In some aspects, the communication network 100 is a wireless local area network (LAN). In some aspects, the communication network 100 is a wireless personal area network (PAN).

The devices in communication network 100 may connect with each other using any wireless mesh compatible protocol such as Sixlowpan, Thread, Zigbee, Bluetooth, and the like. Further, the devices may be configured to detect and measure the RSSI, RCPI, or other signal strength protocol from neighboring devices and either store the RSSI or RCPI in a database or transmit the measurement data to a device with the database. In some aspects, each device may be configured to directly measure the RSSI or RCPI from neighboring devices. In some instances, these measurements may be periodic with time intervals every 1 sec., 10 sec., 30 sec., 1 min., 5 min., 15 min., etc. In some aspects, periodic transmission and measurements may be a configurable setting for each device in the communication network 100.

One reason for periodic measuring is to provide tracking ability to mobile devices. For example, a fob (e.g., key fob 114) may be configured to transmit a signal every 30 min. that may be received at access point 102, thermostat 104, light fixture 106, light switch 108, and power outlet 110. The access point 102, thermostat 104, light fixture 106, light switch 108, and power outlet 110 may measure the RSSI or RCPI and transmit the measurement data (e.g., RSSI or RCPI) from the periodic transmission to determine the last recorded location (e.g., via trilateration technique) of the key fob 114. More so, the location may be relayed to mobile device 112 to provide real-time directions to the last know coordinate of the key fob 114 with respect to coordinate location of the mobile device 112.

Another reason for periodic measuring is to provide sufficient data that may be aggregated to form a statistical distribution between each device which may facilitate a more accurate measurement determination. In particular, the communication network 100 may include stationary devices (e.g., thermostat 104, light fixture 106, light switch 108, power outlet 110, etc.) that provide measurement data with different perspectives that may form a statistical distribution (e.g., Gaussian distribution) with a high precision for a location (e.g., a low standard deviation). Because the device is stationary with a statistical distribution (e.g., Gaussian distribution), the distance measuring system may be able to distinguish measurement inaccuracies.

In some aspects, the communication network 100 may store the measurement data in a database with prior measurement data from each device in the network. The database may be stored at a cloud server, single network entity. The communication network 100 may include a cloud server and one or more network entities. Having the database across more than one storage location for database 426 within the communication network 100 provides self-healing mechanism in case the single network entity within the database fails or the database becomes corrupted. In addition, redundancy across the network provides faster access to querying the database (e.g., local queries without transmitting or relaying information). The tradeoff in redundancy across multiple network entities within the network is that each database will have to be updated and checked for consistencies either periodically or with each adjustment to the database. As such, mechanisms may be established to account for updates and changes to the database to propagate accurate redundancy throughout each database.

Figure 2:
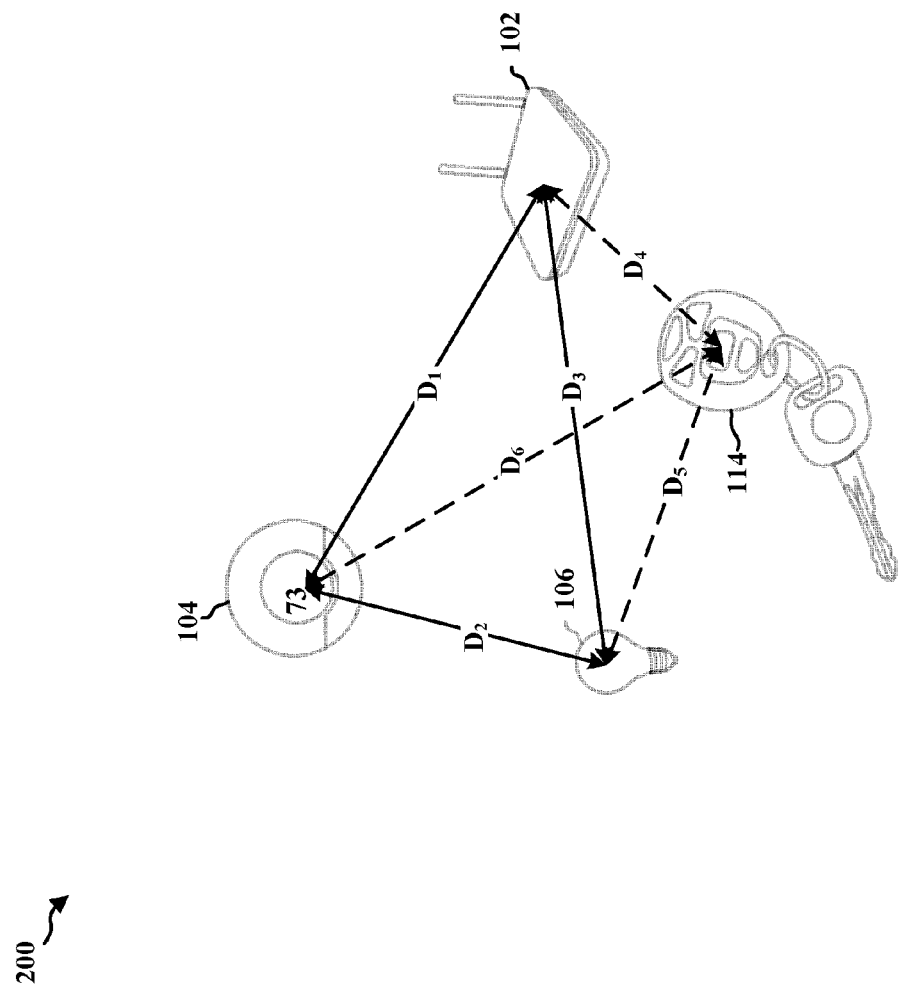
FIG. 2 is a diagram illustrating a trilateration technique to determine the location of a device using one or more devices on the communication network.

FIG. 2 is a diagram illustrating a trilateration technique to determine the location of a device using one or more devices on the communication network. In the simplest form, trilateration mathematically places distance measurements from at least two independent devices (e.g., a first device and a second device) together to form a triangle where the devices are positioned at the vertices of the triangle. In some aspects, access point 102 may receive measurement data from one or more devices that includes a first device, a second device, and optionally a third device. For example, as depicted in FIG. 2, access point 102 receives measurement data from thermostat 104, light fixture 106, and optionally to key fob 114 that are wireless devices within a communication network 100. Once received, access point 102 may append database 426 with the latest measurement data 428 to the prior measurement data 430 detected by the first device and the second device.

The measurement data from thermostat 104 includes signal strength (e.g., RSSI or RCPI) measurements of a signal from light fixture 106. Likewise, the measurement data from light fixture 106 includes signal strength (e.g., RSSI or RCPI) measurements of a signal from thermostat 104. As such, the measurement data transmitted from light fixture 106 and thermostat 104 should be relatively similar since each measurement corresponds to distance $D_2$. The redundant or overdetermined measurements corresponding to distance $D_2$ may be averaged or otherwise manipulated to form the location distribution in order to determine an expected value (e.g., the statistically most likely coordinate) of the location distribution.

Further, measurement data from thermostat 104 includes signal strength (e.g., RSSI or RCPI) measurements of a signal from access point 102, which corresponds to measurement data for distance $D_1$. The signal from thermostat 104 directly provides signal strength (e.g., RSSI or RCPI) measurements, which corresponds to measurement data for distance $D_1$ and is also included in database 426. Similar to $D_2$, the redundant or overdetermined measurements corresponding to distance $D_1$ may be averaged or otherwise manipulated to form the location distribution in order to determine an expected value (e.g., the statistically most likely coordinate) of the location distribution.

The measurement data from light fixture 106 includes signal strength (e.g., RSSI or RCPI) measurements of a signal from access point 102, which corresponds to measurement data for distance $D_3$ and is also included in database 426. The signal from light fixture 106 directly provides signal strength (e.g., RSSI or RCPI) measurements, which corresponds to measurement data for distance $D_3$. Similar to $D_1$ and $D_2$, the redundant or overdetermined measurements corresponding to distance $D_3$ may be averaged or otherwise manipulated to form the location distribution in order to determine an expected value (e.g., the statistically most likely coordinate) of the location distribution.

Optionally, network entity may receive measurement from a third device to further assists in a more accurate location determination of the one or more devices. For example, in some instances, the location for light fixture 106 with respect to access point 102 may be obscured with an object that attenuates the signal, which may yield an inaccurate distance for $D_3$. As depicted in FIG. 2, key fob 114 is adjacent to light fixture 106 and shares an adjacent side, $D_5$. As such, key fob 114 may be used to determine the length of $D_3$. That is, the measurement data may position key fob 114 with respect to access point 102 using $D_1$, $D_4$, and $D_6$ and may position key fob 114 with respect to light fixture 106 using $D_2$, $D_5$, and $D_6$. Consequently, the distance $D_3$ as well as the position of key fob 114 may be in a different location than when originally positioned using $D_1$, $D_2$, and $D_3$. Without more measurements from additional adjacent devices the system may not be able to definitively determine the correct $D_3$ or that the differences in $D_3$ are due to an obstruction. Rather, overdetermined measurements for $D_3$ may be used to determine a location distribution in order to determine an expected value (e.g., the statistically most likely coordinate) of the location distribution. In some instances, particularly when there is insufficient measurement data to form the location distribution, the overdetermined measurements for $D_3$ may be averaged. It should be appreciated that overdetermined measurements corresponding to distances $D_1$, $D_2$, $D_3$, $D_4$, $D_5$, and $D_6$ are not limited to a statistical average as other statistical computations may be implemented such as average weighted, mode, median, etc. In particular, using the median instead of the average for a small set of data measurements may reduce the jitter associated with erroneous coordinate locations. It should also be appreciated that additional devices provides more perspectives and locational data that may be included for a more accurate measurement.

As depicted in FIG. 2, the trilateration technique mathematically places the devices at the vertices of the triangle each at a position with coordinate values. In particular, access point 102 determines coordinate values for each of the first device and the second device based on the measurement data and at least a portion of the prior measurement data. For example, trilateration places distances $D_1$, $D_2$, $D_3$, end-to-end to provide the coordinate locations for each device. It should be noted, that in practice, the distances may not be placed end-to-end. Instead, circle intersections constrain the triangle vertices to precise solutions, given a point of origin (e.g., coordinate (0, 0, 0)). It should further be noted that the first three vertices form the reference plane for subsequent devices in 3-D (e.g., z-reference plane coordinate (0, 0, \*), y-reference plane coordinate (0, \*, 0), x-reference plane coordinate (\*, 0, 0)).

In some instances, the origin (e.g., coordinate (0, 0, 0)) is maintained as the perspective device. For example, thermostat 104 may place the origin (e.g., coordinate (0, 0, 0)) at the thermostat 104 and determine coordinate values for the access point 102 and the light fixture 106 with respect to the thermostat 104. This facilitates measurements with respect to the perspective device but entails determining an offset for a change of perspective to a different device (e.g., change perspective from thermostat 104 to access point 102).

In other aspects, the perspective may be referenced to a particular device. For example, the origin (e.g., coordinate (0, 0, 0)) may be maintained at the access point 102 with an offset determined at each device that is used to determine a coordinate between the devices with respect to the access point 102. The reason for having the perspective referenced to a particular device is that the coordinate values are consistent throughout the network. This facilitates adding coordinate locations to the database and forming location distributions between each device.

In some aspects, network entity may be configured to trigger the one of the first device and the second device that has moved to transmit a range detection signal in accordance with a determination that one of the first device and the second device is moved. That is, if network entity detects that a device has moved, then the network entity may trigger the device that has moved to transmit a range detection signal that may be used to confirm that the device has moved. For example, access point 102, thermostat 104, and light fixture 106 may determine that key fob 114 has moved to a new coordinate location. In turn, the access point 102 may trigger key fob 114 to transmit a range detection signal. In one instance, access point 102, thermostat 104, and light fixture 106 may implement the trilateration technique and determine that key fob 114 has moved and that the new coordinate position is correct. In another instance, access point 102, thermostat 104, and light fixture 106 may implement the trilateration technique and determine that the coordinate location of key fob 114 is unchanged and that the coordinate location that indicates movement is jitter associated with measurement. In some instances, access point 102 may trigger a second or third range detection signal to confirm that key fob 114 has not moved.

In some instances, the range detection signal may include an acoustical component. That is, the range detection signal may implement one or both of a radio signal or an acoustic signal. For example, a key fob 114 may be configured to simultaneously transmit an acoustic signal (e.g., infrasonic, sonic, ultrasonic) and a radio signal (e.g., RSSI or RCPI). In such an example, the range distance from key fob 114 is proportional to the difference in time between receiving the radio signal and the acoustic signal. This technique provides measurement for distance $D_4$, $D_5$, $D_6$ (FIG. 2) independent of RSSI or RCPI. In some aspects, the measurement data may include acoustic information (e.g., time difference between radio signal and acoustic signal).

In some instances, network entity may trigger a device that is in motion to periodically transmit a range detection signal. For example, access point 102 may be configured to trigger key fob 114 to periodically transmit a range detection signal while key fob 114 is in motion. Measurement data from the range detection signal may indicate movement direction and speed of a device in motion.

In some aspects, determining coordinate values between each of a first device (e.g., thermostat 104), a second device (e.g., light fixture 106), and a network entity (e.g., access point 102) includes triggering each of the first device (e.g., thermostat 104) and the second device (e.g., light fixture 106) to transmit data at two or more frequencies.

In some aspects, a device or network entity may be configured to provide measurement data at one or more frequencies. This provides additional redundant data that may be used to form a statistical distribution between each device.

In some instances, the location of one or more devices may be used to form basis vectors established from the coordinate values. Other devices (e.g. the third device) may be gaged with respect to the basis vectors established from the coordinate values. For example, the locations of thermostat 104 and light fixture 106 with respect to access point 102 may provide a statistical distribution that corresponds to a precise statistical coordinate value. In this instance, basis vectors established from thermostat 104 and light fixture 106 with respect to access point 102 may be used a reference location to gage the relative position of another device (e.g., key fob 114).

In an aspect, determining the coordinate values between each of the first device and the second device may include determining a first vector coordinate between the network entity and the first device based on the measurement data received from the one or more devices (e.g., thermostat 104, light fixture 106, light switch 108, power outlet 110, mobile device 112, and key fob 114), and may further include determining a second vector coordinate between the network entity (e.g. access point 102) and the second device (e.g., light fixture 106) based on the measurement data received from the one or more devices. In such an aspect, a device proximity area (e.g., triangular region FIG. 2) is formed between the first vector coordinate and the second vector coordinate. This facilitates proximity detection using vector manipulation from the basis vectors. For example, vector manipulation may be implemented to determine whether a coordinate resides within the device proximity area (e.g., triangular area of FIG. 2). In some aspects, more weight may be given to the devices measured from devices that form the device proximity area than from devices outside the proximity area.

The proximity area may facilitate automation to produce a desired effect. For example, light switch 108 may be configured to turn on a light in light fixture 106 at a specific illumination when mobile device 112 enters a proximity area (e.g., guest room or region within a guest room).

In another example, key fob 114 may have been misplaced in a location within the proximity area (e.g., region of guest room). In order to locate key fob 114, a user may use a location application installed on mobile device 112 to query access point 102 as to the location of key fob 114. In some instances, mobile device 112 may be configured to provide the location of the proximity area (e.g., guest room). This is helpful in reducing the search area for misplaced key fob 114 and may be useful for devices that do not have a large visual display (e.g., wristwatch). In other instances, mobile device 112 may be configured to provide an indicator that can be used to guide the position of the mobile device 112 to key fob 114. In particular, the indicator may indicate "hotter" when the position of mobile device 112 moves toward the position of key fob 114 and "colder" when the position of mobile device 112 moves away from the position of key fob 114. In other instances, the mobile device may be configured to display a map of key fob in relation to other devices. For example, mobile device 112 may display a map with red dots that correspond to stationary device (e.g., light fixture 106, light switch 108, and power outlet 110) and a green dots corresponding to mobile devices (e.g., mobile device 112 and key fob 114). In this example, hovering over a red dot or green dot provides additional information for the user. As such, the user may hover over green dots and red dots to determine where the key fob 114 is positioned in relation to nearby devices and use the map to move to key fob 114 real-time.

Figure 3:
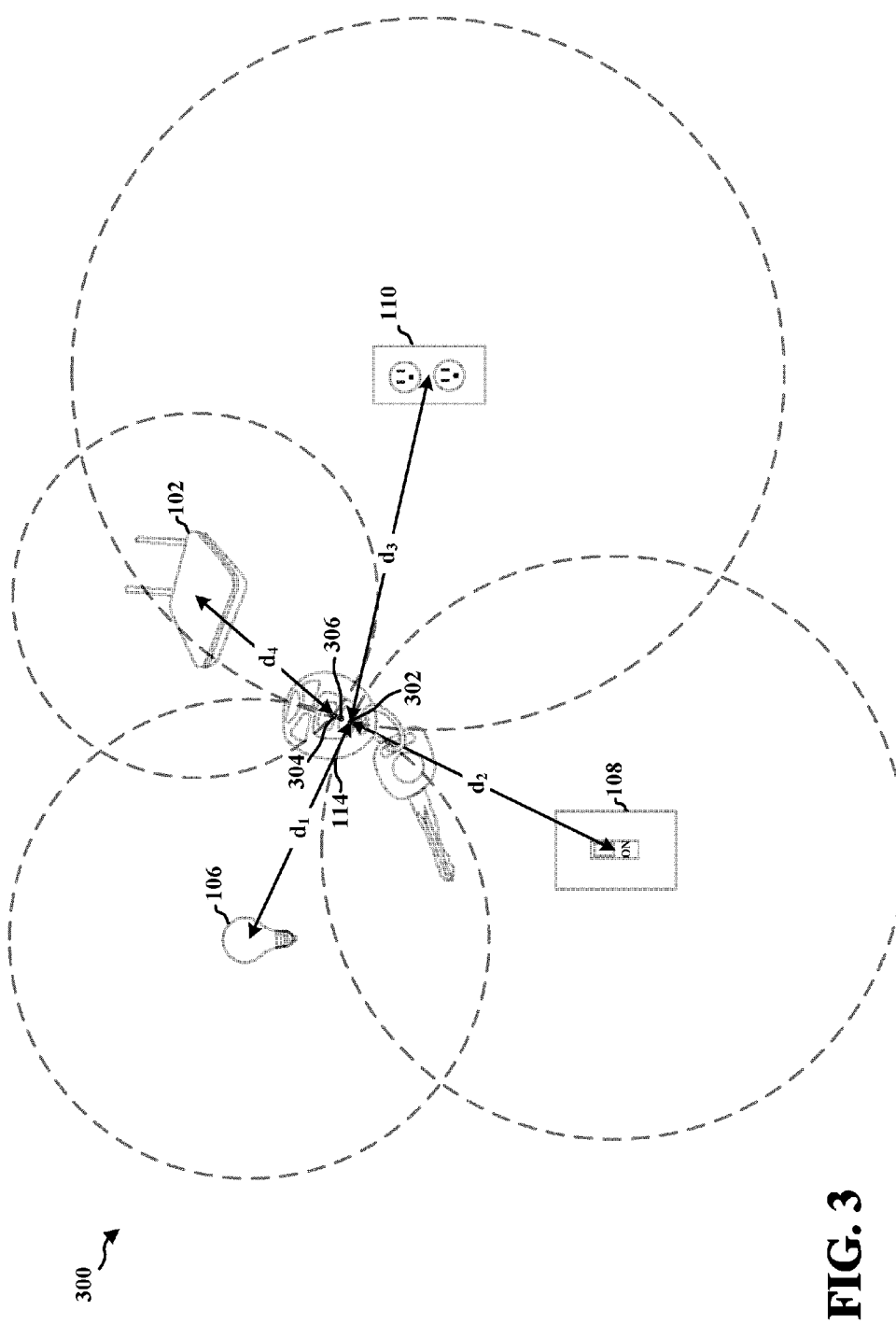
FIG. 3 is a diagram illustrating a trilateration technique for overdetermined data points to determine the location of a device using one or more devices on the communication network.
Figure 4:
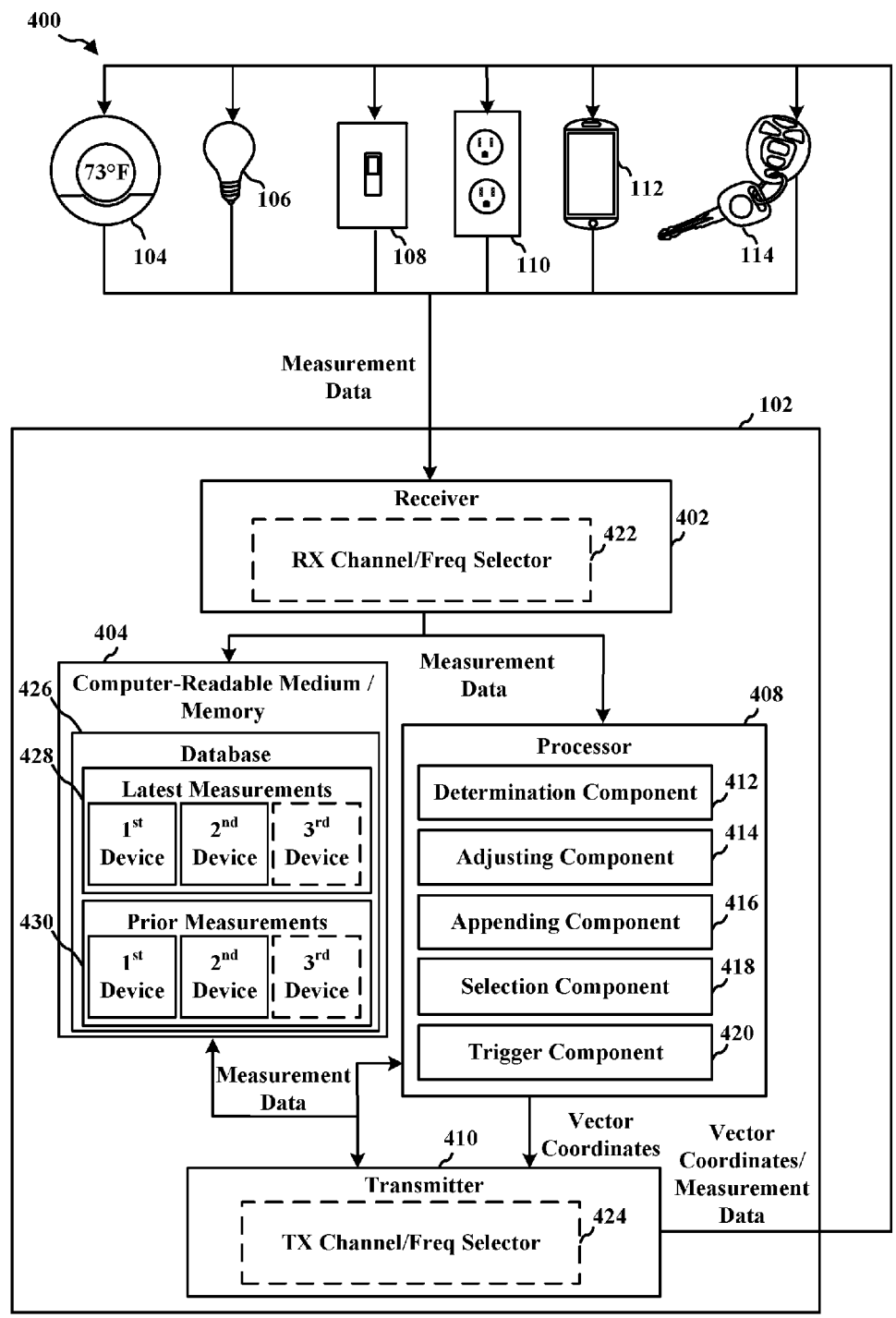
FIG. 4 illustrates conceptual data flow diagram illustrating the data flow between different means/components at a network entity.

FIG. 3 is a diagram illustrating a trilateration technique for overdetermined data points to determine the location of a device using one or more devices on the communication network. The communication network 100 may include multiple coordinate locations for one or more devices. For example, data measurements may determine (e.g., RSSI or RCPI) that key fob 114 is positioned a distance $d_1$ from the light fixture 106, that key fob 114 is positioned a distance $d_2$ from the light switch 108, and that key fob 114 is positioned a distance $d_3$ from the power outlet 110. Trilateration of distances $d_1$, $d_2$, and $d_3$, corresponds to the coordinate location 302 for key fob 114. At the same time, data measurements may determine (e.g., RSSI or RCPI) that key fob 114 is positioned a distance $d_4$ from the access point 102. Trilateration of distances $d_1$, $d_2$, and $d_4$, corresponds to the coordinate location 304 for key fob 114. As depicted in FIG. 4, are nearby but are not exactly coincident which indicates a statistical measurement error in the measurement data (e.g., RSSI or RCPI) for the distances $d_1$, $d_2$, $d_3$, and $d_4$.

One approach to determine a single accurate location for multiple location that correspond to a single device is to average (e.g., arithmetic mean) the coordinate positions. This approach, however, assumes no correlation between the data sets which in some instances is not the case since coordinate location 302 relies on distances $d_1$, $d_2$, and $d_3$, whereas coordinate location 304 relies on distances $d_1$, $d_3$, and $d_4$. That is, both trilateration techniques rely on distances $d_1$ and $d_3$. As such, measurement errors in distances $d_1$ and $d_3$ are correlated and will be propagated through each trilateration. Some aspects, give more weight to correlated distance than to uncorrelated distances. In particular, some aspects implement a weighted average (e.g., weighted arithmetic mean) for coordinate positions based on correlation, a confidence level, or coordinate location of one or more devices.

Another approach to determine a single accurate location for multiple location coordinates that correspond to a single device is to aggregate multiple location coordinates to form a statistical distribution that yields a statistical location. In particular, a network entity may determine a location distribution (e.g., Gaussian distribution) for at least one of the first device and the second device with respect to the network entity based on the measurement values from both the measurement data and at least a portion of the prior measurement data. For example, measurements $d_4$ from access point 102, measurements $d_1$ from light fixture 106, and measurements $d_3$ from power outlet 110 may position key fob 114 at location 304; however, prior measurement data from access point 102 light fixture 106, and power outlet 110 places key fob 114 nearby but not in the exact location. As such, the prior positions of key fob 114 form a location distribution that corresponds to the probability of the location. Based on the location distribution, network entity may determine a statistical coordinate value for the at least one of the first device and the second device. That is, despite the latest measurement location 304, the location distribution based on prior location provides an expected value (e.g., $\mu$) for the statistically most likely coordinate location at location 306.

In some instances, once the expected value is determined, a network entity may adjust the coordinate values in the database of the at least one of the first device and the second device in accordance with the statistical coordinate value. It should be noted that the position of the network entity is not adjusted as the network entity is usually centered at the origin, whereas, each the first device and the second device are adjusted with respect to network entity centered at the origin.

The accuracy of this technique may be further improved by including more than three devices in range to determine the location distribution (e.g., Gaussian distribution). In an aspect, the one or more device may include a third device and the database may include measurement data and prior measurement data detected by the third device. In such an aspect, the technique may further determine coordinate values for the third device based on the measurement data and at least a portion of the prior measurement data. For example including light switch 108 that in conjunction with light fixture 106, and power outlet 110 places the key fob at location 302 the prior positions of key fob 114 with respect to light switch 108, light fixture 106, and power outlet 110 provide a another perspective to the location distribution (e.g., Gaussian distribution). In some aspects, a confidence level may be assigned based on the number of devices used for trilateration (e.g., confidence level increases with the number of devices).

For stationary devices (e.g., thermostat 104, light fixture 106, light switch 108, power outlet 110) including prior measurement data may be applied without concern as location since the stationary devices are non-mobile. In particular, the location distribution (e.g., Gaussian distribution) may not have a large standard deviation (e.g., σ) from the expected value (e.g., μ).

In contrast, mobile devices (e.g., mobile device 112 and key fob 114), an addition step may be implemented to determine whether the one of the first device and the second device has moved based on differences between the measurement data and the prior measurement exceeding a threshold value. For example, a difference between successive sampling time instances of the prior measurement data for the location 304 (e.g., trilateration point of key fob 114 as determined by access point 102 light fixture 106, and power outlet 110) may exceed an error tolerance threshold that indicates movement in time.

In some aspects, network entity may be configured to select the at least a portion of the prior measurement data from the database in accordance with a determination that one of the first device and the second device is unmoved. For example, key fob 114 may be unmoved for a period of time (e.g., 1 hr.) and during that time measurement data was gathered and appended to database 426. As such, access point 102 may select the prior data of the key fob 114 over the time period up to the movement (e.g., measurement data over the past 1 hr.).

In some instances, the threshold to determine movement may depend on environmental factors. For example, receive power signal (e.g., RSSI or RCPI) at one device may fluctuate at a different standard deviation than another receive power signal (e.g., RSSI or RCPI) at another device. As such, the threshold to detect movement may be different, where one is more sensitive than another. To compensate for these discrepancies the threshold value to detect movement may be heuristically based on the location distribution as seen by the measurement data. In some aspects, the threshold value may be based on signal strength (e.g., RSSI or RCPI). In other aspects, the threshold value may be based on coordinate values.

Additional heuristics may be added to improve coordinate accuracy. For example, the measurement data may indicate that the signal strength (e.g., RSSI or RCPI) of stationary devices (e.g., thermostat 104, light fixture 106, light switch 108, power outlet 110, etc.) varies with environmental factors such as time of day when a people in a crowded room may obstruct the receive power signal (e.g., RSSI or RCPI). In this instance, the accumulated measurement data may indicate that the loss path parameter varies within a range of particular stationary devices. As such, the loss path parameters may be heuristically adjusted in accordance with the accumulated measurement data.

In some aspects, network entity may be configured to trigger the one of the first device and the second device that has moved to transmit a range detection signal in accordance with a determination that one of the first device and the second device is moved. For example, the access point 102 may trigger key fob 114 to transmit a range detection signal in the event that the access point 102 detects key fob 114 is moved. As such, the thermostat 104, light fixture 106, light switch 108, power outlet 110, and the access point 102 may receive the range detection signal and may implement the trilateration technique to determine the coordinate location of key fob 114 to confirm that key fob 114 has moved.

In some aspects, network entity may trigger a device that is in motion to periodically transmit a range detection signal. For example, access point 102 may be configured to trigger key fob 114 to periodically transmit a range detection signal while key fob 114 is in motion.

In some aspects, the measurement data or the prior measurement data may include redundant measurement values detected at two or more frequencies. In some aspects, the technique to determine coordinate values between each of a first device, a second device, and the network entity may comprise triggering one of the first device and the second device to transmit data at two or more frequencies.

In some aspects, the technique to determine coordinate values between each of a first device, a second device, and the network entity may include averaging redundant measurement values of the measurement data or redundant measurement values of the prior measurement data. For example, the distance measured from one frequency may be with the statistical error the distance measured from another frequency. As such, the redundant measurement values may be averaged.

In some instances, averaging the redundant measurement values of the measurement data or redundant measurement values of the prior measurement data may be a weighted average. For example, measurement values from adjacent devices that are not obstructed may corresponds to the distance measurement of one measured frequency but not another measured frequency. In this instance, the measured frequency that corresponds to adjacent devices may be given higher weight than the other measured frequencies. In some aspects, the technique to determine coordinate values between each of a first device, a second device, and the network entity includes weight averaging overdetermined measurement values of the measurement data or overdetermined measurement values of the prior measurement data based on overlapping devices for trilateration.

In some aspects, the measurement data includes identification information of the one or more devices. The identification information may indicate whether the device is stationary or mobile. For example, key fob 114 may indicate in a message to access point 102 that the key fob 114 is a mobile device. In some instances, the key fob 114 may include configurable settings such as a human readable identifier (e.g., Service Set Identifier (SSID)) for additional identification information.

FIG. 4 illustrates conceptual data flow diagram illustrating the data flow between different means/components at a network entity. The network entity may be an access point 102. The network entity includes a receiver 402, a computer readable medium 404, and a processor 408, and a transmitter 410. The processor 408 includes a determination component 412, an adjusting component 414, an appending component 416, a selection component 418, and a trigger component 420. The computer-readable medium/memory 404 includes a database 426. The database 426 includes the latest measurements 428 from a first device, a second device, and an optional third device down through n-devices along with prior measurements 430 from a first device, a second device, and an optional third device down through n-devices. In some aspects, the database is a relation database such as structured query language (SQL). The receiver 402 includes an RX channel or frequency selector that is configured to receive a signal from one or more frequencies (e.g., channels). The transmitter 410 includes a TX channel or frequency selector that is configured to transmit a signal at one or more frequencies (e.g., channels). In some aspects, the receiver 402 and the transmitter 410 may be a transceiver configured to send and receive data at one or more frequencies (e.g., channels). In one aspect, the receiver 402 is configured to receive measurement data from one or more devices (e.g., thermostat 104, light fixture 106, light fixture 108, power outlet 110, mobile device 112, and key fob 114).

In this configuration, the one or more devices may include a first device and a second device. The processor 408, particularly, the appending component 416 is configured to append database 426 with the measurement data. In this configuration, the database includes the latest measurement data 428 and prior measurement data 430 detected by the first device and the second device. The processor 408, particularly, the determination component 412 is configured to determine coordinate values for each of the first device, the second device, and the network entity based on the latest measurement data 428 and at least a portion of the prior measurement data 430.

In one configuration, the processor 408, particularly, the determination component 412 is configured to determine a location distribution for at least one of the first device and the second device with respect to the network entity based on the measurement values from both the latest measurement data 428 and at least a portion of the prior measurement data 430. In this configuration, the processor 408, particularly, the determination component 412 is configured to determine a statistical coordinate value for the at least one of the first device, the second device, and the network entity. In this configuration, the processor 408, particularly, the adjusting component 414 is configured to adjust the coordinate values in the database 426 of the at least one of the first device and the second device in accordance with the statistical coordinate value. In such a configuration, the statistical coordinate value corresponds to an expected value (e.g., the statistically most likely coordinate) of the location distribution.

In one configuration, the processor 408, particularly, the determination component 412 is configured to determine whether the one of the first device and the second device has moved based on differences between the latest measurement data 428 and the prior measurement 430 exceeding a threshold value. In this configuration, the processor 408, particularly, the selection component 418 is configured to select the at least a portion of the prior measurement data 430 from the database 426 in accordance with a determination that one of the first device, the second device, and the network entity is unmoved. In such a configuration the threshold value is heuristically based on a location distribution. Alternatively, in such a configuration, the processor 408, particularly, the trigger component 420 is configured to trigger the one of the first device and the second device that has moved to transmit a range detection signal in accordance with a determination that one of the first device and the second device is moved.

In one configuration, the latest measurement data 428 or the prior measurement data 430 include redundant measurement values detected at two or more frequencies (e.g., via RX channel/freq selector 422 of receiver 422). In one configuration, the processor 408, particularly, the determination component 412 configured to determine coordinate values between each of a first device, a second device, and the network entity includes having the processor 408, particularly, the trigger component 420 trigger one of the first device and the second device to transmit data at two or more frequencies. In one configuration, the processor 408, particularly, the determination component 412 configured to determine coordinate values between each of a first device, a second device, and the network entity includes averaging redundant measurement values of the latest measurement data 428 or redundant measurement values of the prior measurement data 430. In one configuration, the one or more device includes a third device and the database 426 includes latest measurement data 428 and prior measurement data 430 detected by the third device. In this configuration, the processor 408, particularly, the determination component 412 configured to determine coordinate values for the third device based on the measurement data and at least a portion of the prior measurement data. In one configuration, the processor 408, particularly, the determination component 412 configured to determine coordinate values between each of a first device, a second device with respect to network entity includes weight averaging overdetermined measurement values of the latest measurement data 428 or overdetermined measurement values of the prior measurement data 430 based on overlapping devices for trilateration.

In some configurations, the measurement data includes identification information of the one or more devices. In some configurations, the measurement data includes signal strength information. In some configurations, the one or more devices, the first device, and the second device is each an IoT device. In some configurations, the network entity is one of a server, a relay, or a router. In some configurations, the communication network 100 is a mesh network. In some configurations, the communication network 100 is a wireless local area network.

Figure 5:
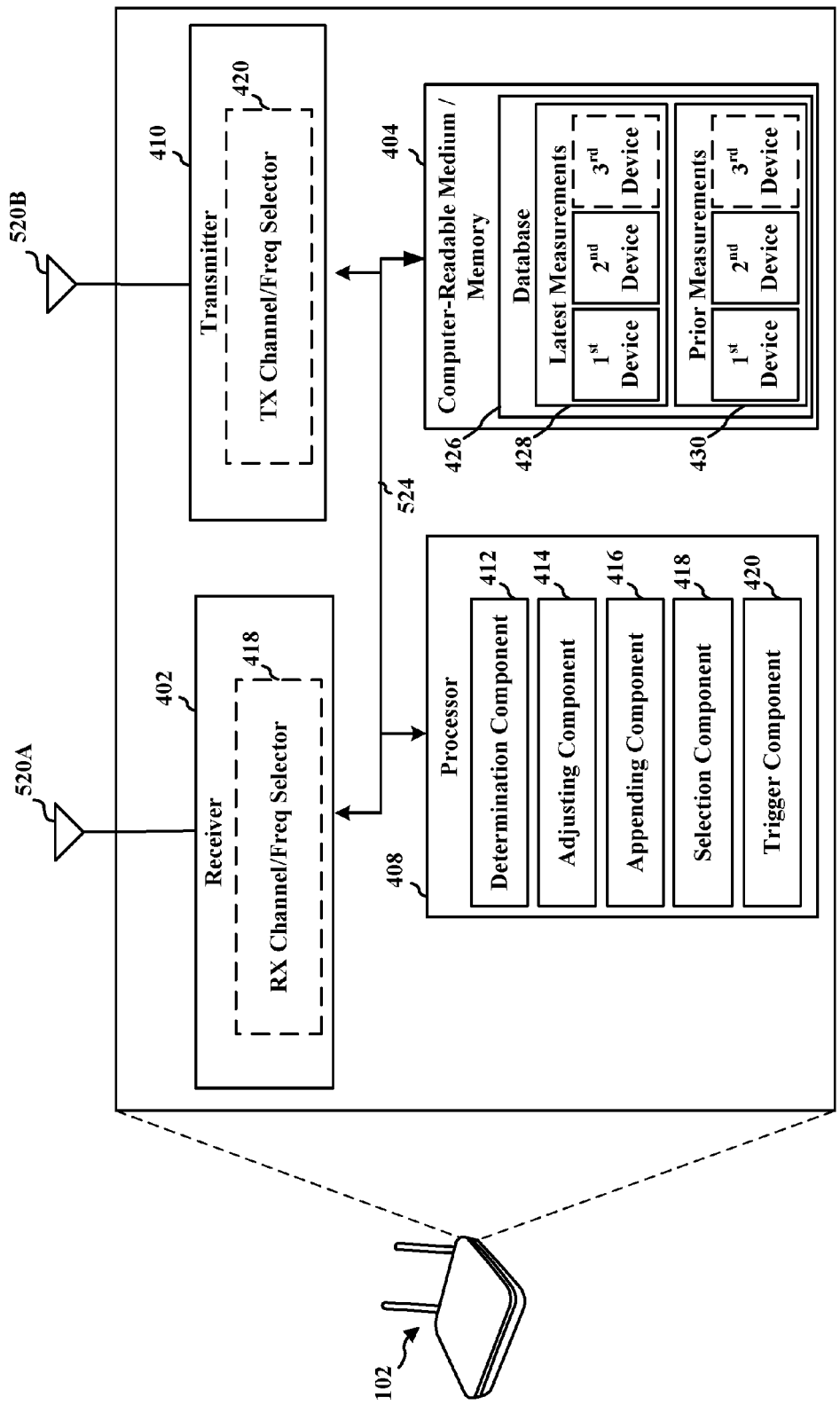
FIG. 5 is a flow diagram of a method of locating one or more network devices by a network entity with a communication network.

The technique, in particular, the network entity may include additional components that perform each of the blocks of the algorithm in the aforementioned flowcharts of FIG. 5. As such, each block in the aforementioned flowcharts of FIG. 6 may be performed by a component and the network entity may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 5 is a diagram illustrating an example of a hardware implementation for a network entity 102 for locating one or more network devices. The network entity 102 may be implemented with a bus architecture, represented generally by the bus 524. The bus 524 may include any number of interconnecting buses and bridges depending on the specific application of the network entity 102 and the overall design constraints. The bus 524 links together various circuits including one or more processors and/or hardware components, represented by the processor 408, the receiver 402, the transmitter, and the computer-readable medium/memory 404. The bus 524 may also link various other circuits such as timing sources, peripherals, voltage regulators, and power management circuits.

The receiver 402 may be electrically coupled to an antenna 520A and the transmitter 410 may be electrically coupled to an antenna 520B. The transmitter 410 provides a means for communicating with various other apparatus over a transmission medium via antenna 520B. The receiver 402 receives a signal from the antenna 520A, extracts information from the received signal, and provides the extracted information across the bus 524 to processor 408 or to be stored on the computer-readable medium/memory 404. As part of receiving the signal, receiver 402 detects the signal strength (e.g., RSSI or RCPI) and includes the signal strength with the extracted information. The processor 408 or the computer-readable medium/memory 404 provide information to the transmitter 410, which in turn generates a signal to be applied to the antenna 520B. The network entity 102 includes a processor 408 coupled to a computer-readable medium/memory 404. The processor 408 is responsible for general processing, including the execution of software stored on the computer-readable medium/memory 404. The software, when executed by the processor 408, causes the system to perform the various functions described above. The computer-readable medium/memory 404 may also be used for storing data that is manipulated by the processor 408 when executing software. The network entity 102 further includes at least one of the determination component 412, the adjusting component 414, the appending component 416, the selection component 418, and the trigger component 420. The components may be software components running in the processor 408, resident/stored in the computer readable medium/memory 404, one or more hardware components coupled to the processor 408, or some combination thereof. The network entity 102 may be one of a server, a relay, or a router.

It should be appreciated that network entity may be an IoT device similar to the one or more devices.

Figure 6:
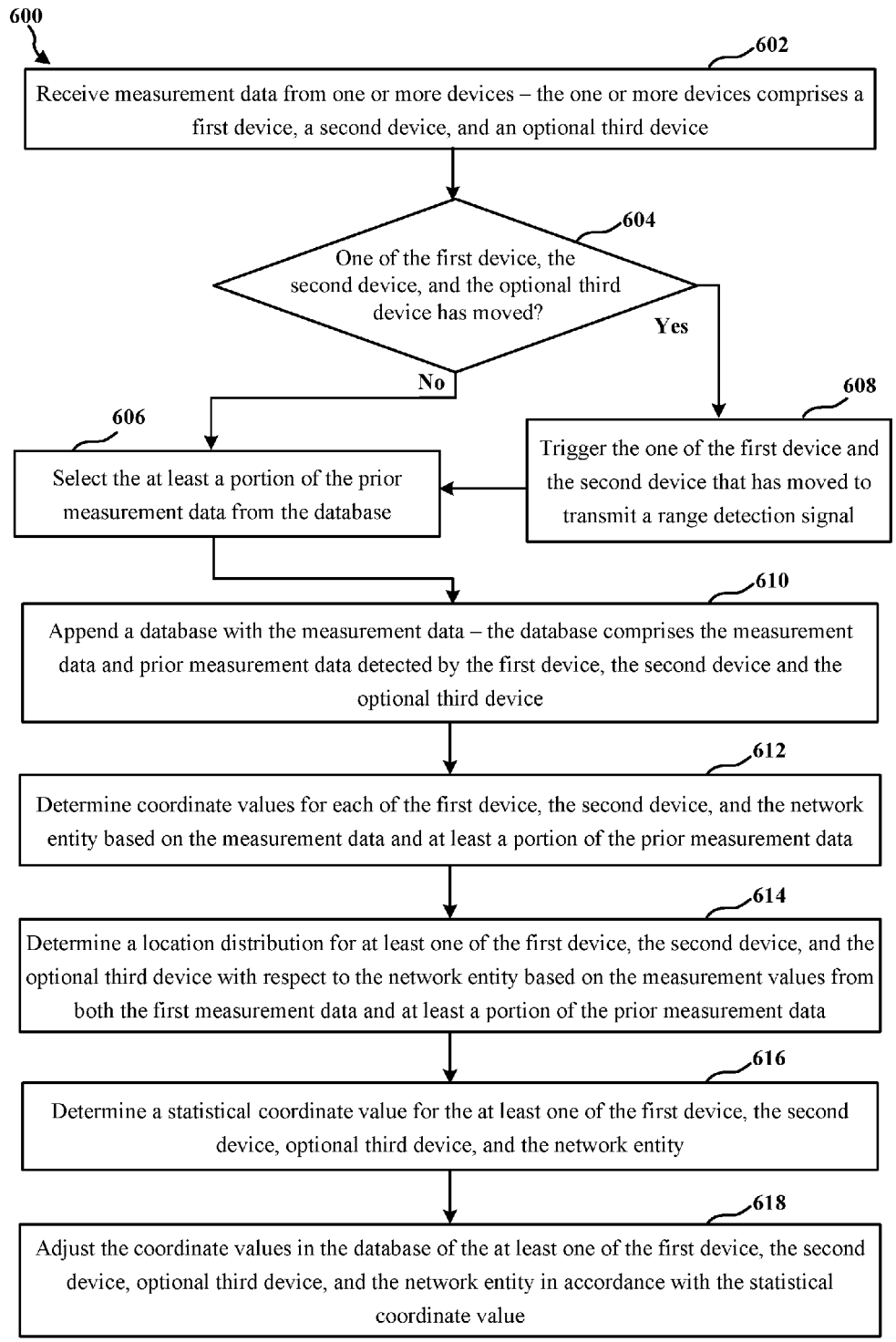
FIG. 6 is a diagram illustrating an example of a hardware implementation for a network entity for locating one or more network devices.

FIG. 6 is a flow diagram of a method of locating one or more network devices by a network entity with a communication network.

At block 602, method 600 may receive measurement data (e.g., latest measurement data 428 or prior measurement data 430) from one or more devices. In particular, the one or more devices may include a first device, a second device, and an optional third device. For example, access point 102 may receive measurement data from thermostat 104, light fixture 106, and optionally connect to the key fob 114, as depicted in FIG. 2.

In some aspects, the measurement data or the prior measurement data may include redundant measurement values detected at two or more frequencies. The redundant measurement data provides a check for against erroneous.

At block 604, method 600 may determine whether the one of the first device and the second device has moved based on differences between the latest measurement data 428 and the prior measurement 430 exceeding a threshold value. For example, in FIG. 3, a difference between successive sampling time instances of the prior measurement data 430 for the location 304 (e.g., trilateration point of key fob 114 as determined by access point 102 light fixture 106, and power outlet 110) may exceed an error tolerance threshold that indicates movement in time.

The threshold value may vary based on the location distribution formed for each device. For example, a thermostat 104 is a stationary device that may form a location distribution with a standard deviation lower than a standard deviation of a location distribution for mobile device 112. As such, the threshold value for thermostat 104 may differ from mobile device 112. In some aspects, the threshold value is based on the standard deviation of the location distribution of the device. In other aspects, the threshold value is based on a heuristic. For example, key fob 114 may be moved around certain times or the day (e.g., moving key to drive to work). As such, the threshold value may be adapted based on anticipated movement.

At block 606, method 600 may select the at least a portion of the prior measurement data 430 from the database 426 in accordance with a determination that one of the first device, the second device, and the network entity is unmoved. For example, in FIG. 3, a difference between successive sampling time instances of the prior measurement data 430 for the location 304 (e.g., trilateration point of key fob 114 as determined by access point 102 light fixture 106, and power outlet 110) may fall under an error tolerance threshold that indicates no movement in time At block 608, method 600 may trigger the one of the first device and the second device that has moved to transmit a range detection signal in accordance with a determination that one of the first device, the second device, and the network entity is moved. That is, an object may be configured to transmit a range detection signal to nearby devices once it is detected that the object has moved. For example, access point 102 may determine that key fob 114 has moved based on differences between the measurement data and the prior measurement and in turn, access point 102 may transmit a signal to key fob 114 that triggers key fob 114 to transmit a range detection signal that may confirm the new location of a moved object.

In some instances, the range detection may provide a direction of movement. In particular, a network entity may be configured to trigger a device to periodically transmit a range detection signal while device is in motion. As such, neighboring device may implement the trilateration technique to determine periodic coordinate locations over time that indicates movement directions, speed, etc. For example, once it is determined that key fob 114 has moved, access point 102 may periodically trigger key fob 114 to transmit a range detection signal (e.g., every second, every 10 seconds, etc.) that when received by thermostat 104, light fixture 106, and access point 102 applies the trilateration technique to determine coordinate values that are logged in database 426.

In some instances, the periodicity to transmit a range detection signal may be heuristically adjusted to provide a fluid movement. For example, a user may place key fob 114 in their pocket and walk around a room. In this instance, if the periodicity to transmit a range detection signal is to large (e.g., 1 every minute) the key fob 114 may appear to sporadically jump to various locations without a smooth movement path. In contrast, if the periodicity to transmit a range detection signal is too small (e.g., 1 every microsecond) the key fob 114 may not appear to move at all (e.g., differences between a range detection signal and a prior range detection signal), which may cause the access point 102 to determine that key fob 114 has stopped moving.

At block 610, method 600 may append a database with the measurement data and the database may include the measurement data and prior measurement data detected by the first device and the second device. For example, the measurement as depicted in FIG. 4, access point 102 may receive (e.g., via receiver 403) measurement data from one or more devices (e.g., thermostat 104, light fixture 106, light switch 108, power outlet 110, mobile device 112, and key fob 114) and provide the measurement data to database 426 of computer readable medium/memory 404. The stores the latest measurements of the first device, second device, third device, and up to n-devices (not shown) as well as, prior measurements of the first device, second device, third device, and up to n-devices (not shown).

At block 614, method 600 may determine coordinate values for each of the first device and the second device based on the measurement data and at least a portion of the prior measurement data. For example, as depicted in FIG. 2, access point 102 may implement the trilateration technique to determine the coordinate values for the thermostat 104, the light fixture 106 based distances $D_1$, $D_2$, $D_3$, derived from the signal strength (e.g., RSSI or RCPI). The origin (e.g., coordinate value (0, 0, 0)) may be at access point 102 with coordinate locations for the thermostat 104 and light fixture 106 determined with respect to access point 102.

In some aspects, the technique to determine coordinate values between each of the first device and the second device includes averaging redundant measurement values of the measurement data or redundant measurement values of the prior measurement data. That is, a device may include multiple measurements from the same devices that are received at substantially the same time (e.g., multiple frequencies) and are redundant. Averaging each redundant measurement is one way to provide a single coordinate value that represents the location at that instance. In contrast, overdetermined measurements correspond to the same coordinate location but are detected from one or more different devices. For example, location 304 and location 302 are overdetermined coordinate values since each corresponds to a detected coordinate values from one or more different devices. In some aspects, the technique to determine coordinate values between each of the first device and the second device includes weight averaging overdetermined measurement values of the measurement data or overdetermined measurement values of the prior measurement data based on overlapping devices for trilateration.

At block 614, method 600 may determine a location distribution for at least one of the first device and the second device with respect to the network entity based on the measurement values from both the measurement data and at least a portion of the prior measurement data. For example, as depicted in FIG. 2, the determined coordinate locations base on the measurement distances $D_1$ and $D_3$ for thermostat 104 and the light fixture 106 may be aggregated with prior measurement distances to form a distribution (e.g., Gaussian distribution).

At block 616, method 600 may determine a statistical coordinate value for the at least one of the first device and the second device. That is, latest measurement data 428 and prior measurement data 430 may be used to form a location distribution for key fob 114 that corresponds to the probability distribution of the location. Based on the location distribution network entity may determine a statistical coordinate value for the at least one of the first device and the second device that corresponds to an expected value (e.g., the most likely location). For example, as depicted in FIG. 3, the position of key fob 114 as determined from measurements for distance $d_4$ from access point 102, measurements for distance $d_1$ from light fixture 106, and measurements for distance $d_3$ from power outlet 110 may be at location 304. At the same time, prior measurement data 430 from access point 102 light fixture 106, and power outlet 110 may position key fob 114 at location 302. Each location for key fob 114 may be determined and stored in database 426 to form the location distribution and the location distribution may be used to provide an expected value (e.g., $\mu$) for the statistically most likely coordinate location at location 306. In some aspects, the statistical coordinate value corresponds to an expected value (e.g., the statistically most likely coordinate) of the location distribution.

At block 618, method 600 may adjust the coordinate values in the database of the at least one of the first device and the second device in accordance with the statistical coordinate value. In particular, the database 426 may include coordinate values for the one or more devices (e.g., thermostat 104, light fixture 106, power switch 108, power outlet 110, mobile device 112, and key fob 114, etc.). In some aspects, the coordinate values may be the last known positions and may include a history of prior known positions. The addition of the latest measurement values to the prior measurement values may change the expected value (e.g., $\mu$) for the coordinate value. For example, including the latest measurement data 428 to the location distribution may yield a slightly different expected value (e.g., $\mu$) for the thermostat 104 and the light fixture 106. As such, the slightly different expected value (e.g., $\mu$) for the thermostat 104 and the light fixture 106 may replace the latest known locations in the database 426 or alternatively the slightly different expected value (e.g., $\mu$) for the thermostat 104 and the light fixture 106 be appended to the latest coordinate locations for database 426.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C §112(f) unless the element is expressly recited using the phrase "means for."

What is claimed is:

1. A method, at a network entity, for determining coordinates of one or more devices within a wireless communication network, the method comprising:
receiving range detection signals from the one or more devices, wherein the one or more devices include a first device and a second device;
determining latest distances between each the first device, the second device, and the network entity;
determining a probability distribution of coordinates for each of the first device and the second device from the latest distances and at least a portion of prior distances from a database;
determining coordinates for each of the first device and the second device based on the probability distribution of coordinates; and appending the database with at least one of the range detection signals, the latest distances, and the coordinates.

2. The method of claim 1, further comprising:
adjusting the latest distances in the database of one or both of the first device and the second device in accordance with distances that correspond to the coordinate.

3. The method of claim 1, wherein the coordinate corresponds to at least one of an expected value, average, weighted average, mode, and median of the probability distribution.

4. The method of claim 1, the determining coordinates further comprises:
determining whether the one of the first device and the second device has changed coordinates based on differences between the latest distances and the prior distances exceeding a threshold value; and
selecting the at least a portion of the prior distances from the database in accordance with a determination that coordinates of one of the first device and the second device is unchanged.

5. The method of claim 4, wherein the threshold value is heuristically adjusted based on the probability distribution of coordinates.

6. The method of claim 4, further comprises:
triggering the one of the first device and the second device that has changed coordinates to transmit a range detection signal in accordance with a determination that one of the first device and the second device has changed coordinates.

7. The method of claim 1, wherein one or both of the latest distances and the prior distances include redundant distances detected from signals simultaneously transmitted at two or more signal frequencies from a same device of the one or more devices.

8. The method of claim 1, further comprising:
triggering one or more of the first device, the second device, and the network entity to simultaneously transmit a range detection signal at two or more signal frequencies.

9. The method of claim 1, wherein determining coordinates between each of the first device and the second device includes averaging redundant distances of the latest distances or redundant distances of the prior distances, wherein redundant distances correspond to two or more distances determined from two or more signals simultaneously transmitted at two or more signal frequencies from a same device of the one or more devices.

10. The method of claim 1, wherein the one or more devices includes a third device and the database includes latest distances and prior distances between each the first device, the second device, the third device, and the network entity, resulting in overdetermined measurements, and wherein determining the latest distances between the one or more devices based on the received range detection signals includes latest overdetermined distances between each the first device, the second device, the third device, and the network entity, and wherein
determining coordinates for the one or more devices accommodates for the third device such that the coordinates for each of the first device, the second device, and the third device is based on the latest overdetermined distances and at least a portion of the prior distances.

11. The method of claim 10, wherein the at least a portion of the prior distances corresponds to distances gathered successively over a period of time where each of the first device, the second device, the third device and the network entity are considered unmoved, and wherein determining coordinates between each of the first device, the second device, the third device, and the network entity includes weight averaging overdetermined measurements of one or both of the latest distances or the prior distances from one or more overlapping devices for trilateration.

12. The method of claim 1, wherein the range detection signals include a mobility identification indicator for at least one of the one or more devices that identifies whether a device is a stationary device or a mobile device.

13. The method of claim 8, wherein at least one transmitted signal corresponds to an acoustic frequency and at least one transmitted signal corresponds to a radio frequency.

14. The method of claim 13, further comprising:
calculating a time difference between the radio frequency signal and the acoustic frequency signal; and
determining latest distances between the network entity and one or both of the first device and the second device that transmitted the range detection signal based on a difference in time between receiving the radio frequency signal at the network entity and receiving the acoustic frequency signal at the network entity.

15. The method of claim 1, wherein the one or more devices and the network entity connect with each other using multiple wireless protocols that includes at least one of Sixlowpan, Thread, Zigbee, WiFi, or Bluetooth.

16. The method of claim 15, wherein at least one of the one or more devices and the network entity is configured to simultaneously transmit or receive signals using two or more wireless protocols.

17. The method of claim 1, wherein the communication network is a mesh network.

18. The method of claim 12, further comprising:
determining differences in a loss path parameter associated with a signal strength of received range detection signals between one or more identified stationary devices;
determining a probability distribution of the loss path parameter for one or more times of day for each of the one or more identified stationary devices; and
adjusting the loss path parameter for at least one of the one or more devices based on a time of day corresponding to the probability distribution for the one or more times of day.

19. A non-transitory computer-readable storage medium comprising one or more programs for execution by one or more processors of a network entity, the one or more programs including instructions which, when executed by the one or more processors, cause the electronic device to:
receive range detection signals from the one or more devices, wherein the one or more devices include a first device and a second device;
determine latest distances between each the first device, the second device, and the network entity;
determine a probability distribution of coordinates for each of the first device and the second device from the latest distances and at least a portion of prior distances from a database;
determine coordinates for each of the first device and the second device based on the probability distribution of coordinates; and
append the database with at least one of the range detection signals, the latest distances, and the coordinates.

20. The non-transitory computer-readable storage medium of claim 19, further comprising instructions to cause the electronic device to:
adjust the latest distances in the database of one or both of the first device and the second device in accordance with distances that correspond to the coordinate.

21. The non-transitory computer-readable storage medium of claim 19, wherein the coordinate corresponds to at least one of an expected value, average, weighted average, mode, and median of the probability distribution.

22. The non-transitory computer-readable storage medium of claim 19, the instructions to determine coordinates further comprises instructions to cause the electronic device to:
determine whether the one of the first device and the second device has changed coordinates based on differences between the latest distances and the prior distances exceeding a threshold value; and
select the at least a portion of the prior distances from the database in accordance with a determination that coordinates of one of the first device and the second device is unchanged.

23. The non-transitory computer-readable storage medium of claim 22, wherein the threshold value is heuristically adjusted based on the probability distribution of coordinates.

24. The non-transitory computer-readable storage medium of claim 22, further comprising instructions to cause the electronic device to:
trigger the one of the first device and the second device that has changed coordinates to transmit a range detection signal in accordance with a determination that one of the first device and the second device has changed coordinates.

25. The non-transitory computer-readable storage medium of claim 19, wherein one or both of the latest distances and the prior distances include redundant distances detected from signals simultaneously transmitted at two or more signal frequencies from a same device of the one or more devices.

26. The non-transitory computer-readable storage medium of claim 19, further comprising instructions to cause the electronic device to:
trigger one or more of the first device, the second device, and the network entity to simultaneously transmit a range detection signal at two or more signal frequencies.

27. The non-transitory computer-readable storage medium of claim 19, wherein the instructions to determine coordinates between each of the first device and the second device includes instructions to average redundant distances of the latest distances or redundant distances of the prior distances, wherein redundant distances correspond to two or more distances determined from two or more signals simultaneously transmitted at two or more signal frequencies from a same device of the one or more devices.

28. The non-transitory computer-readable storage medium of claim 19, wherein the one or more devices includes a third device and the database includes latest distances and prior distances between each the first device, the second device, the third device, and the network entity, resulting in overdetermined measurements, and wherein the instructions to determine the latest distances between the one or more devices based on the received range detection signals includes latest overdetermined distances between each the first device, the second device, the third device, and the network entity, and wherein the instructions to determine coordinates for the one or more devices accommodates for the third device such that the coordinates for each of the first device, the second device, and the third device is based on the latest overdetermined distances and at least a portion of the prior distances.

29. The non-transitory computer-readable storage medium of claim 28, wherein the at least a portion of the prior distances corresponds to distances gathered successively over a period of time where each of the first device, the second device, the third device and the network entity are considered unmoved, and wherein instructions to determine coordinates between each of the first device, the second device, the third device, and the network entity includes instructions to weight average overdetermined measurements of one or both of the latest distances or the prior distances from one or more overlapping devices for trilateration.

30. The non-transitory computer-readable storage medium of claim 19, wherein the range detection signals include a mobility identification indicator for at least one of the one or more devices that identifies whether a device is a stationary device or a mobile device.

31. The non-transitory computer-readable storage medium of claim 26, wherein at least one transmitted signal corresponds to an acoustic frequency and at least one transmitted signal corresponds to a radio frequency.

32. The non-transitory computer-readable storage medium of claim 31, further comprising instructions to cause the electronic device to:
calculate a time difference between the radio frequency signal and the acoustic frequency signal; and
determine latest distances between the network entity and one or both of the first device and the second device that transmitted the range detection signal based on a difference in time between receiving the radio frequency signal at the network entity and receiving the acoustic frequency signal at the network entity.

33. The non-transitory computer-readable storage medium of claim 19, wherein the one or more devices and the network entity connect with each other using multiple wireless protocols that includes at least one of Sixlowpan, Thread, Zigbee, WiFi, or Bluetooth.

34. The non-transitory computer-readable storage medium of claim 33, wherein at least one of the one or more devices and the network entity is configured to simultaneously transmit or receive signals using two or more wireless protocols.

35. The non-transitory computer-readable storage medium of claim 19, wherein the communication network is a mesh network.

36. The non-transitory computer-readable storage medium of claim 30, further comprising instructions to cause the electronic device to:
determine differences in a loss path parameter associated with a signal strength of received range detection signals between one or more identified stationary devices;
determine a probability distribution of the loss path parameter for one or more times of day for each of the one or more identified stationary devices; and
adjust the loss path parameter for at least one of the one or more devices based on a time of day corresponding to the probability distribution for the one or more times of day.

37. A system configured to locate one or more network devices, comprising:
one or more processors;

memory; and one or more programs stored in memory, the one or more programs including instructions for:

receiving range detection signals from the one or more devices, wherein the one or more devices include a first device and a second device;

determining latest distances between each the first device, the second device, and the network entity;

determining a probability distribution of coordinates for each of the first device and the second device from the latest distances and at least a portion of prior distances from a database;

determining coordinates for each of the first device and the second device based on the probability distribution of coordinates; and appending the database with at least one of the range detection signals, the latest distances, and the coordinates.

38. The system of claim 37, the one or more programs further including instructions for:

adjusting the latest distances in the database of one or both of the first device and the second device in accordance with distances that correspond to the coordinate.

39. The system of claim 37, wherein the coordinate corresponds to at least one of an expected value, average, weighted average, mode, and median of the probability distribution.

40. The system of claim 37, the determining coordinates further comprises:

determining whether the one of the first device and the second device has changed coordinates based on differences between the latest distances and the prior distances exceeding a threshold value; and selecting the at least a portion of the prior distances from the database in accordance with a determination that coordinates of one of the first device and the second device is unchanged.

41. The system of claim 40, wherein the threshold value is heuristically adjusted based on the probability distribution of coordinates.

42. The system of claim 40, the one or more programs further including instructions for:

triggering the one of the first device and the second device that has changed coordinates to transmit a range detection signal in accordance with a determination that one of the first device and the second device has changed coordinates.

43. The system of claim 37, wherein one or both of the latest distances and the prior distances include redundant distances detected from signals simultaneously transmitted at two or more signal frequencies from a same device of the one or more devices.

44. The system of claim 37, the one or more programs further including instructions for:

triggering one or more of the first device, the second device, and the network entity to simultaneously transmit a range detection signal at two or more signal frequencies.

45. The system of claim 37, wherein determining coordinates between each of the first device and the second device includes averaging redundant distances of the latest distances or redundant distances of the prior distances, wherein redundant distances correspond to two or more distances determined from two or more signals simultaneously transmitted at two or more signal frequencies from a same device of the one or more devices.

46. The system of claim 37, wherein the one or more devices includes a third device and the database includes latest distances and prior distances between each the first device, the second device, the third device, and the network entity, resulting in overdetermined measurements, and wherein determining the latest distances between the one or more devices based on the received range detection signals includes latest overdetermined distances between each the first device, the second device, the third device, and the network entity, and wherein determining coordinates for the one or more devices accommodates for the third device such that the coordinates for each of the first device, the second device, and the third device is based on the latest overdetermined distances and at least a portion of the prior distances.

47. The system of claim 46, wherein the at least a portion of the prior distances corresponds to distances gathered successively over a period of time where each of the first device, the second device, the third device and the network entity are considered unmoved, and wherein determining coordinates between each of the first device, the second device, the third device, and the network entity includes weight averaging overdetermined measurements of one or both of the latest distances or the prior distances from one or more overlapping devices for trilateration.

48. The system of claim 37, wherein the range detection signals include a mobility identification indicator for at least one of the one or more devices that identifies whether a device is a stationary device or a mobile device.

49. The system of claim 44, wherein at least one transmitted signal corresponds to an acoustic frequency and at least one transmitted signal corresponds to a radio frequency.

50. The system of claim 49, the one or more programs further including instructions for:

calculating a time difference between the radio frequency signal and the acoustic frequency signal; and determining latest distances between the network entity and one or both of the first device and the second device that transmitted the range detection signal based on a difference in time between receiving the radio frequency signal at the network entity and receiving the acoustic frequency signal at the network entity.

51. The system of claim 37, wherein the one or more devices and the network entity connect with each other using multiple wireless protocols that includes at least one of Sixlowpan, Thread, Zigbee, WiFi, or Bluetooth.

52. The system of claim 51, wherein at least one of the one or more devices and the network entity is configured to simultaneously transmit or receive signals using two or more wireless protocols.

53. The system of claim 37, wherein the communication network is a mesh network.

54. The system of claim 48, the one or more programs further including instructions for:

determining differences in a loss path parameter associated with a signal strength of received range detection signals between one or more identified stationary devices;

determining a probability distribution of the loss path parameter for one or more times of day for each of the one or more identified stationary devices; and adjusting the loss path parameter for at least one of the one or more devices based on a time of day corresponding to the probability distribution for the one or more times of day.

* * * * *